Nov. 5, 1968  S. R. KRAUSE  3,409,176
AUTOMATIC LIQUID DISPENSING DEVICE FOR COCKTAILS AND THE LIKE
Filed June 29, 1967  11 Sheets-Sheet 1
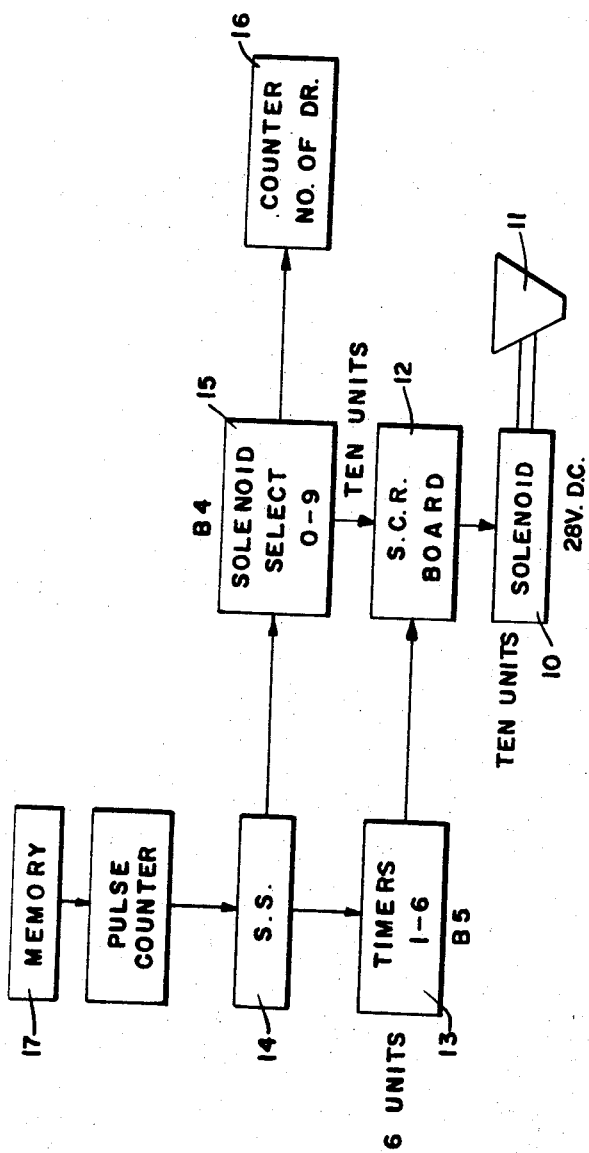
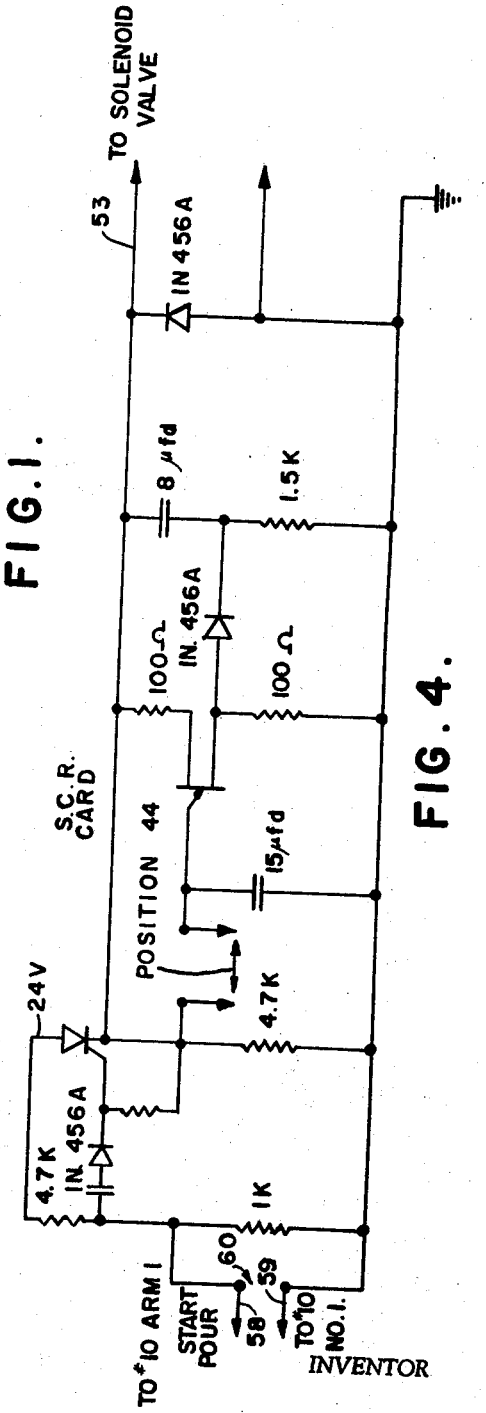
INVENTOR
Stephen R. Krause
BY Wilkinson, Mawhinney & Theibault
ATTORNEYS INVENTOR
Stephen R. Krause

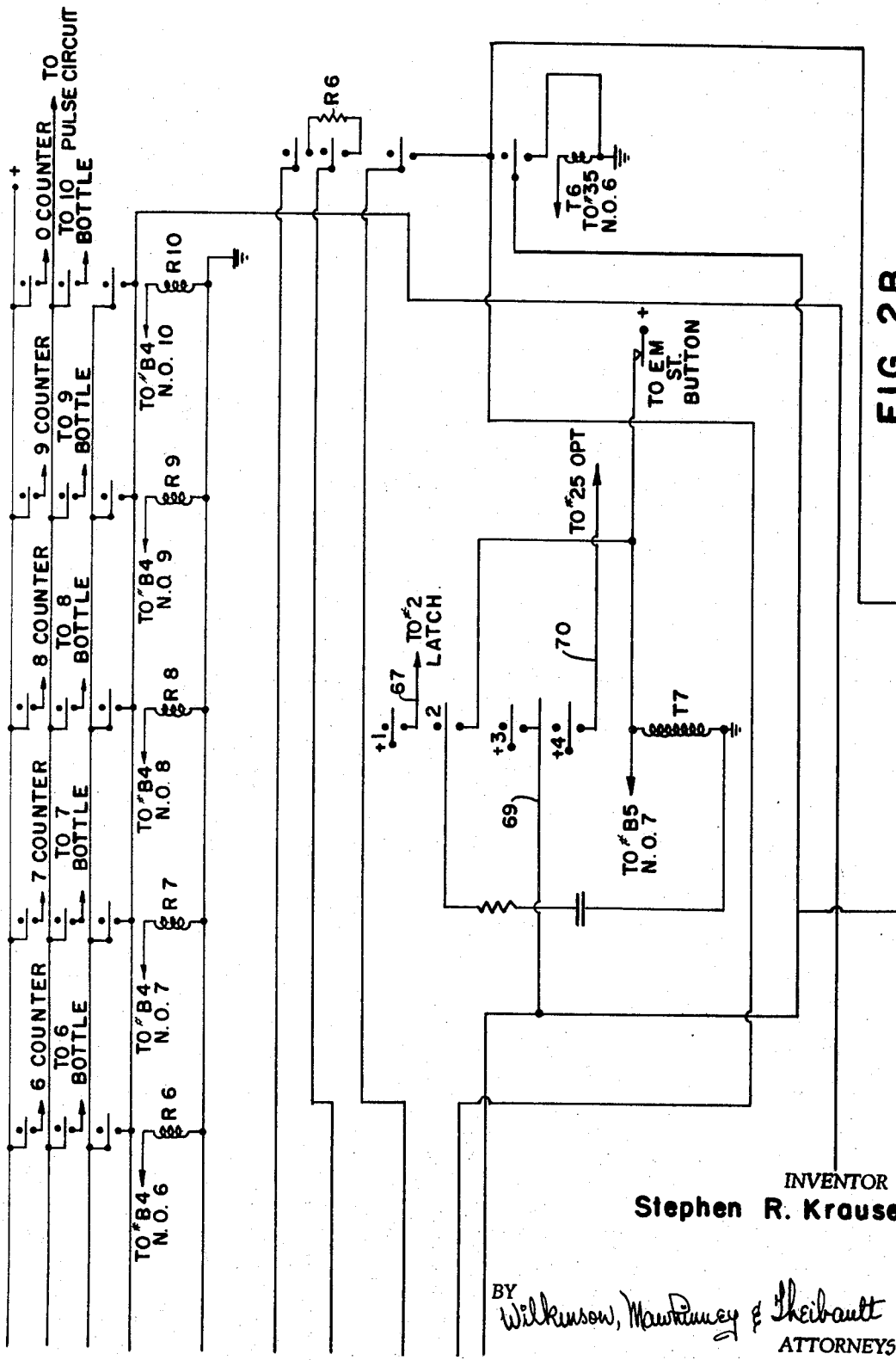

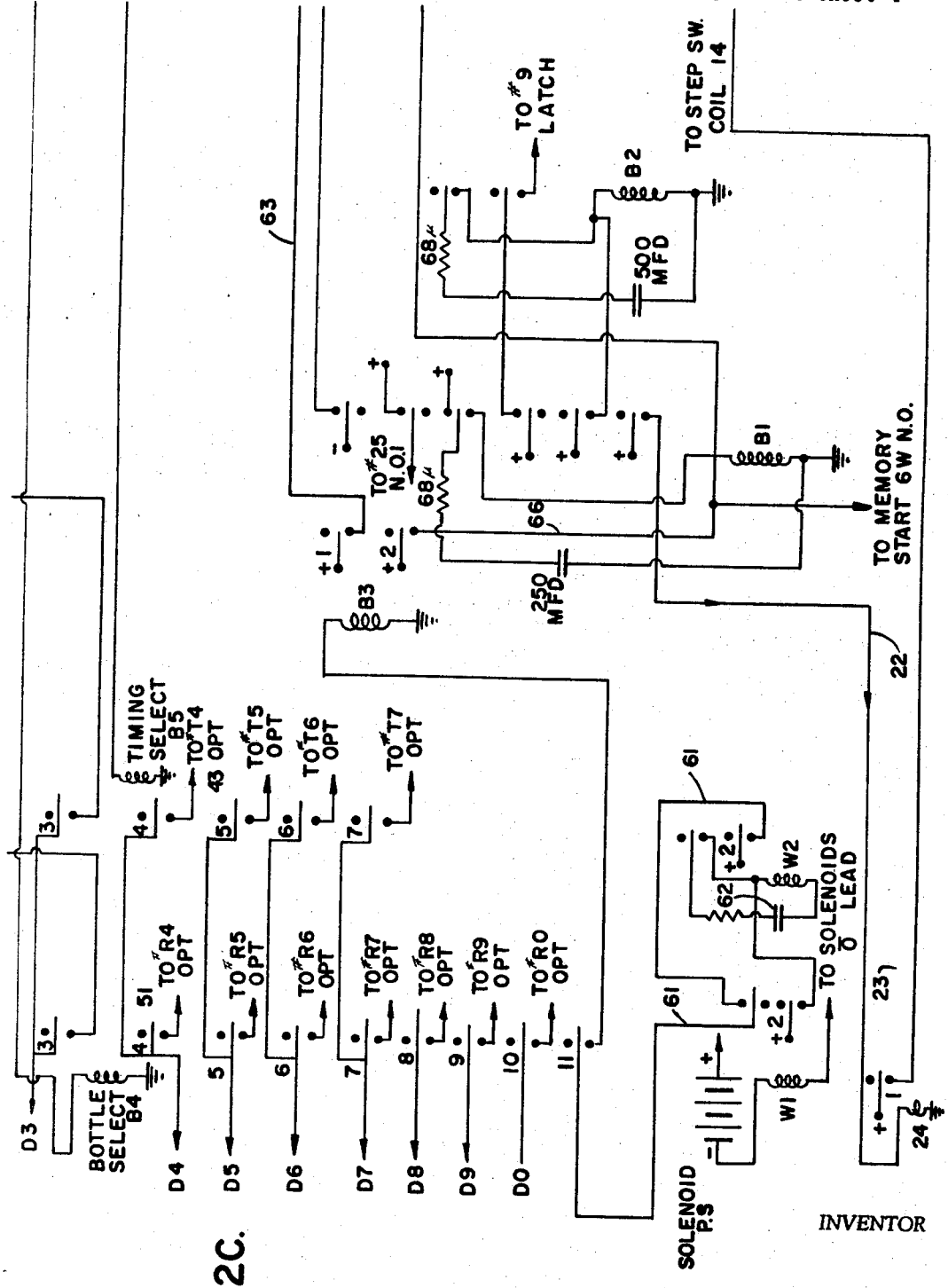

INVENTOR
Stephen R. Krause

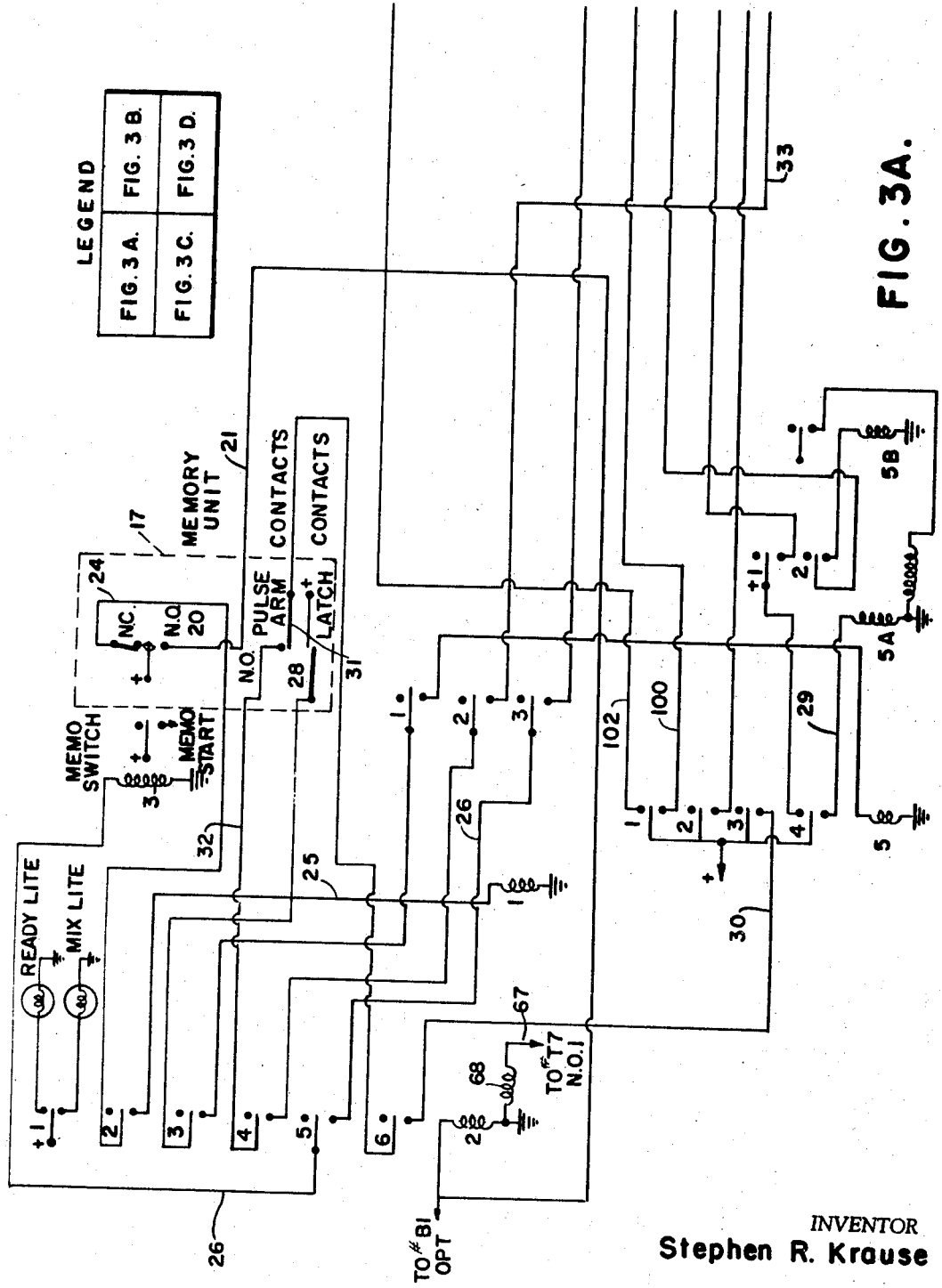

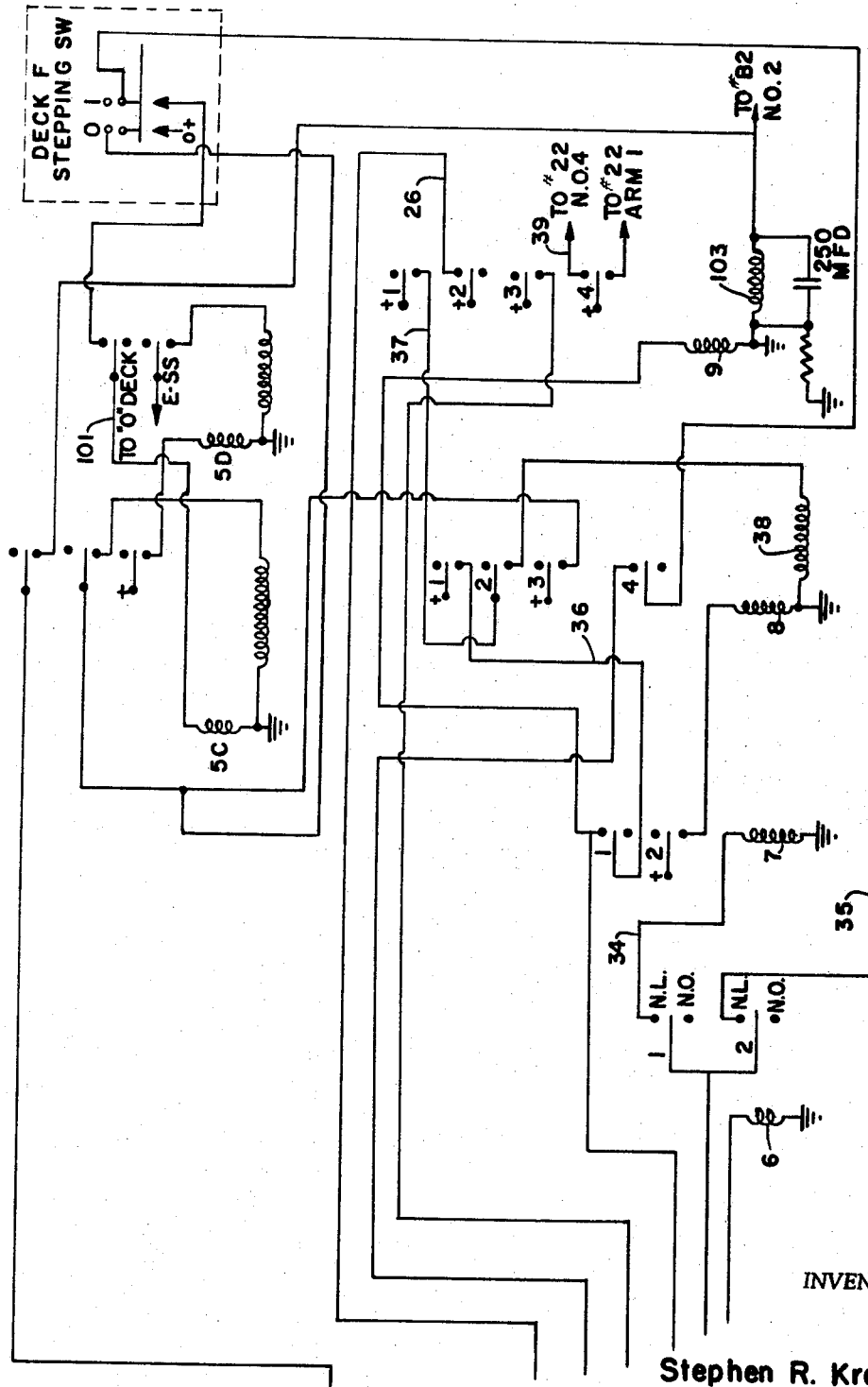

Nov. 5, 1968        S. R. KRAUSE        3,409,176
AUTOMATIC LIQUID DISPENSING DEVICE FOR COCKTAILS AND THE LIKE
Filed June 29, 1967                    11 Sheets-Sheet 11

INVENTOR
Stephen R. Krause

BY
Wilkinson, Mawhinney & Theibautt
ATTORNEYS

United States Patent Office 3,409,176
Patented Nov. 5, 1968

3,409,176
AUTOMATIC LIQUID DISPENSING DEVICE FOR COCKTAILS AND THE LIKE
Stephen R. Krause, Baltimore, Md., assignor to K & M Electronics Company, Baltimore, Md., a corporation of Maryland
Filed June 29, 1967, Ser. No. 650,030
5 Claims. (Cl. 222—70)

ABSTRACT OF THE DISCLOSURE

The present invention is directed to a plural liquid dispensing device of the type employed in mixing and dispensing alcoholic cocktails from plural containers each holding a different liquid and which containers are solenoid valve dispensed. The period of solenoid actuation of the dispensing valve is controlled by selectively placing timing units in circuit with the actuating solenoid of the liquid flow valve, each unit of which represents a time period for holding the valve open dependent upon the desired quantity of the liquid being dispensed according to the beverage formula magnetically stored on an endless magnetic tape memory which operates in sequence the solenoid select circuit and the timer unit for the selected liquid flow.

---

The present invention relates to automatic liquid dispensing machines and more particularly to the type of machine in which more than one liquid is mixed in predetermined ratios with another and preferably where a plurality of liquids are mixed, by way of example, for cocktail drinks and the like.

An object of the present invention is a provision of a plurality of reservoirs each containing a different liquid and each container supplying a solenoid actuated valve wherein the valves are under the control electrically of any one of a plurality of selective timing units and whereby the solenoid valves and hence the ingredients in a container supplying a particular solenoid valve are preselected in pre-ordained sequence.

A further object of the present invention is the provision of a machine of the type described further including solenoid circuit triggering means in selective circuit with the timing units and under the control of the timing units for gating an SCR which will actuate the particular programmed selected solenoid.

A further object of the present invention is the provision of switch control means in circuit with the time unit resistors and the solenoid selectors to sequentially program the dispensing of liquid from the container with co-mixed plurality of liquids.

A still further object of the present invention is the provision of a liquid dispensing apparatus as above described which is connected to and controlled by a selectively programmed signal device which in the preferred embodiment is an endless magnetic tape memory upon which is carried magnetic pulses stored on the tape as to the sequence and amount of each of the ingredients in a plurality of mixed combinations.

A further object of the present invention is to provide an alcoholic beverage dispensing unit for use by restaurants and catering firms and which will prepare up to a thousand different mixed drinks, accounting and keeping record of the number of drinks dispensed and amounts of each liquid ingredient employed.

A still further object of the present invention is the provision of a unit which completely prevents pilferage by a service bartender who is not being watched.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a block diagram of the circuitry employed in the operation of the present invention.

FIGURES 2A through 2D are the electrical schematic wiring diagram of timing and solenoid select circuit.

FIGURES 3A through 3D are the schematic of electrical wiring diagrams of the pulse counting action and pulse train discriminator.

FIGURE 4 is an electrical schematic of the SCR and power driving circuit.

Figure 5:
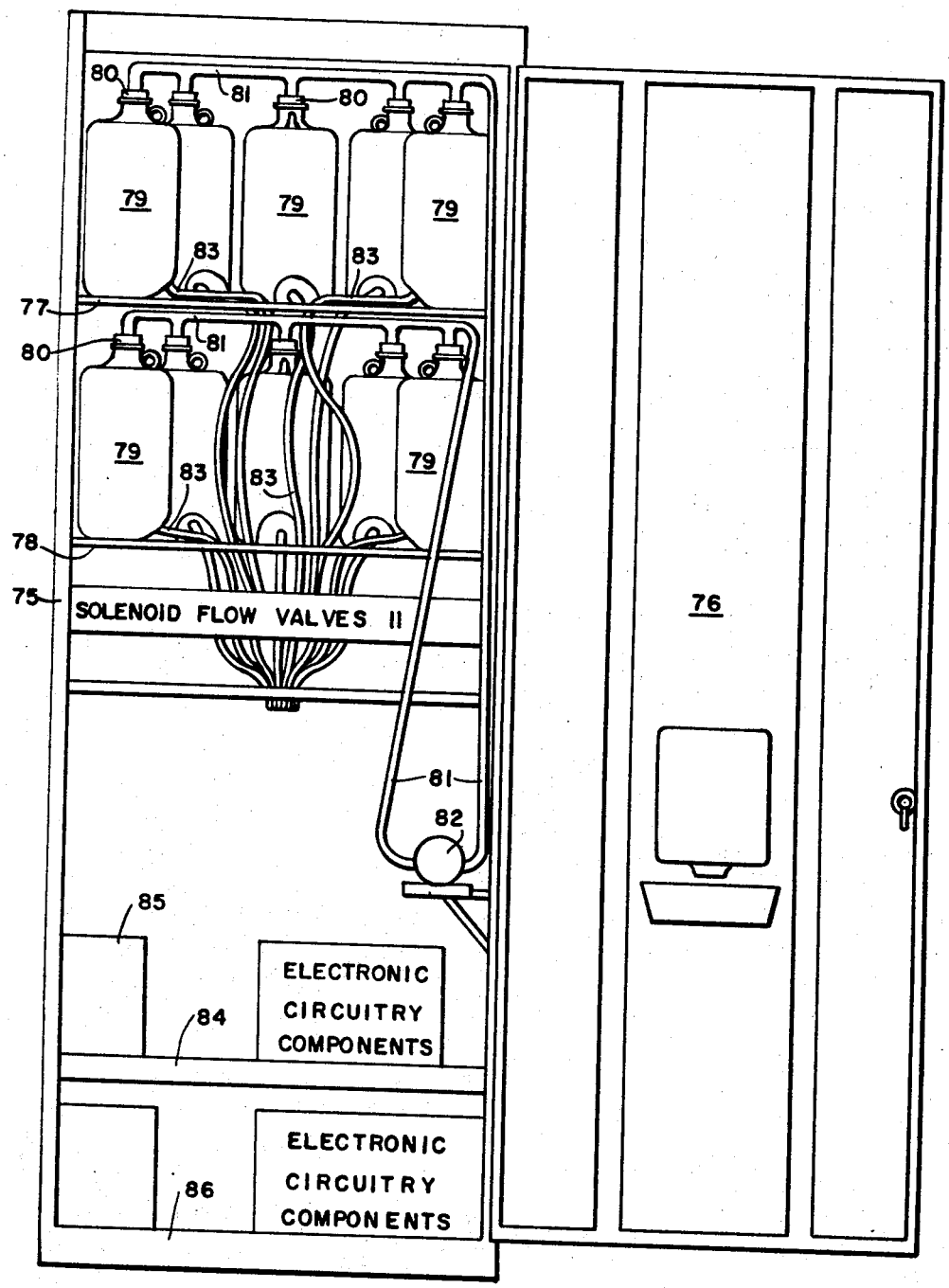
Figure 6:
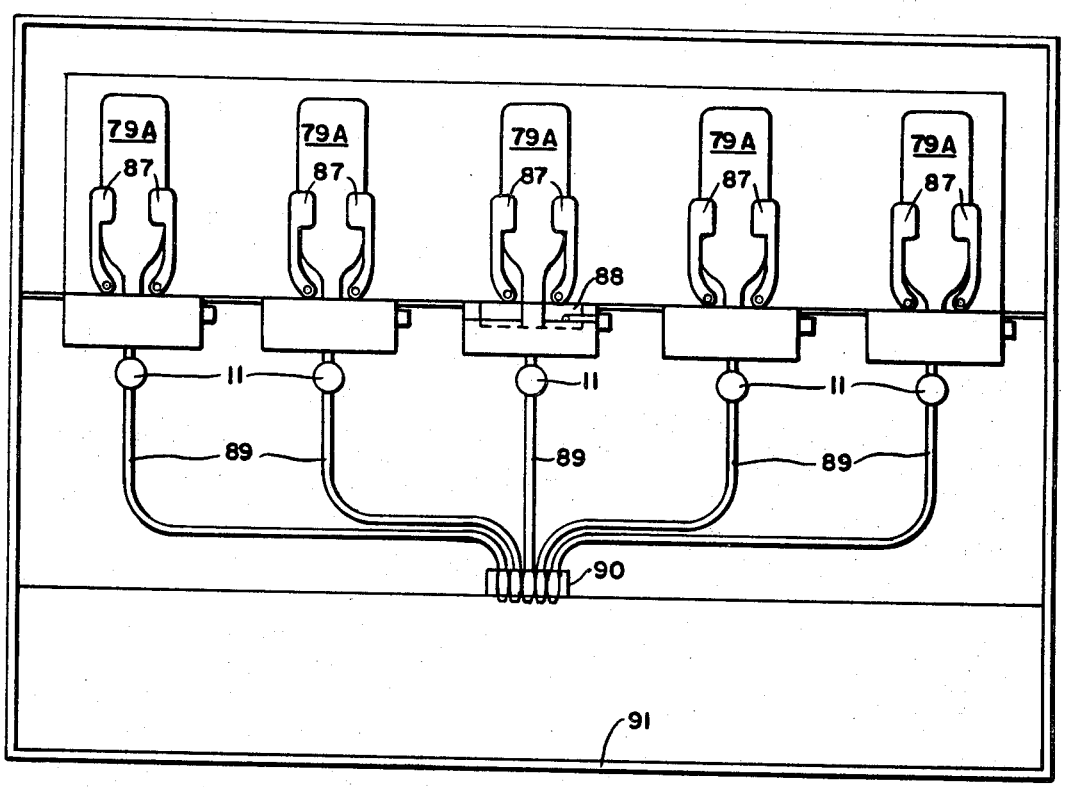

FIGURE 5 is a front elevational view of one embodiment of the present invention with the cabinet door open showing the liquid reservoirs or containers and the head maintaining pressure circuit; and FIGURE 6 is a modified form of liquid container or reservoir mounting means for supplying liquid to the mixing center not requiring the positive head maintaining means of the embodiment shown in FIGURE 5.

Referring more particularly to the drawings and for the moment to FIGURE 1, 10 designates a solenoid of a plurality of groups of solenoids for actuating liquid flow valves 11, there being one fluid control valve for each solenoid and one fluid control valve for each container containing a liquid to be measured and dispensed. The solenoid 10 is actuated through an SCR board 12.

The SCR board 12 has an input from a group of timers 13 which comprises selectively any one of a plurality of resistors representative of time units, by way of example, one second, one and one-half second, two seconds, etc. The timer circuit 13 is under the control of a step switch 14 which places the desired one of the plurality of time resistors in circuit to gate the control firing SCR on the SCR board 12 for controlling the solenoid 10 and hence the fluid flow through the valve 11 controlling the output of discharge of each liquid container.

The step switch 14 and solenoid selectors and timers are programmed from the reading of an endless magnetic tape 17 on which is stored a plurality of pulses, each pulse train of which represents a compounded unit. In pulse train sequence, each sequence of which signals a compounding of a mixture of liquids stored in the apparatus of the present invention, by way of example, one train sequence would represent a martini, which would, in pulse train, set up the time interval that is to be set up in timer unit 13 for the dispensing of gin as well as select the particular solenoid to permit flow of gin from the gin container. The next pulse train would set up the time unit necessary in unit 13 for a proper flow of vermouth, the control valve of which is selected from the solenoid select group 15.

Figure 2A:
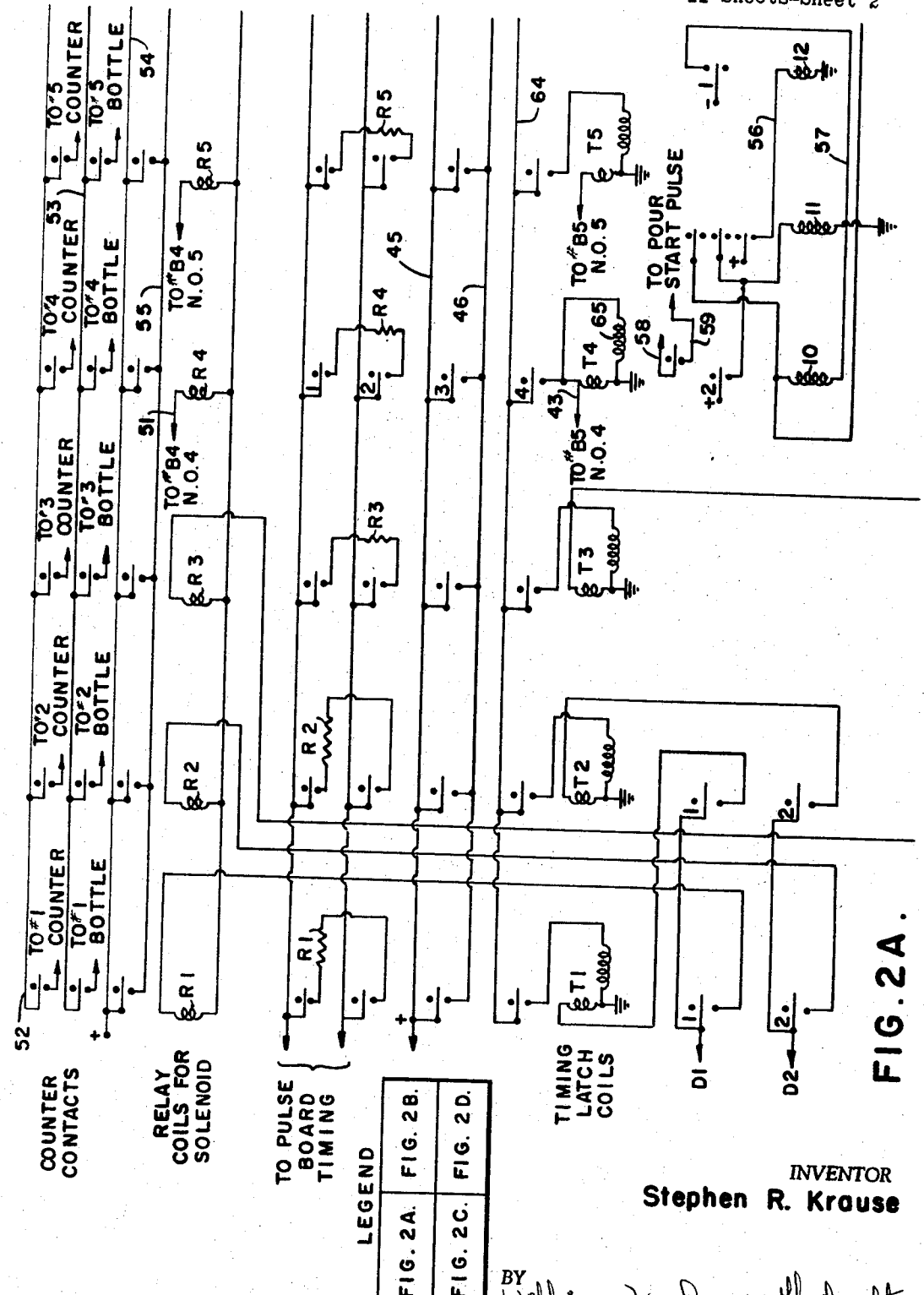

Referring now to FIGURES 3A through 3D; upon depressing switch 20 on the tape memory unit positive current flow through the arm of switch 20 through lead 21 into relay 2 causing relay 2 contacts 1–6 to pull in and latch. Simultaneously current flows from switch 20 to lead 21 into relay B1 shown in FIGURE 2C causing current to flow from arm 6 of relay B1 into lead 22 to relay 24 (FIGURE 2C). As relay 24 is energized plus current flows through arm 1 of relay 24 through lead 23 and into the coil of step switch 14 (FIGURE 2D) causing the arms of stepping switch 14 to switch from normally open contact 0 to normally open contact 1. Plus current then flows through arm 1, deck 1 of step switch 14, into the now closed, normally opened contact 1, of deck 1 and into relay B5 shown in FIGURE 2C causing relay B5 to operate and lock. As switch 20 is released positive current then flows through the normally closed contact of switch 20 through lead 24 into arm 2 of relay 2 and into the now closed, normally opened, contact of relay 2 and into relay 1 through lead 25 causing relay 1 to actuate and close contacts 1, 2 and 3 thereof.

Power now flows from arm 2 of relay 9 through normally closed contact 2 of relay 9 into lead 26 and into the now closed, normally opened, contact 3 of relay 1 and into the now closed, normally opened, contact 5 of relay 2 and into the coil of relay 3 causing relay 3 to operate and close.

As relay 3 closes positive current flows through the arm of relay 3 into the memory unit causing memory unit 17 to start reading. Latch 28 of memory unit 17 now closes causing positive current to flow through latch 28 into arm 3 of relay 2 into the now closed, normally opened, contacts 3 of relay 2 into the arm 1 of relay 1. Current then flows from the now closed, normally opened, contact 1 of relay 1 into coil of relay 5 causing relay 5 to close and latch in.

As relay 5 closes positive current flows from arm 4 of relay 5 into the coil of relay 5a over lead 29 causing latch relay 5a to energize closing normally opened contacts 1 and 2 to a closed position.

Each pulse in the pulse train coming from memory unit 17 is of a duration of 100 milli-seconds. It should be further pointed out that the timing between pulses of a pulse train is also 100 milli-seconds.

Relay 7 is a slow release relay. When actuated it requires an interruption of 400 milli-seconds to de-energize its coil.

The pulse contacts make causing current to flow through the arm contact set of 31 into the now closed, normally opened, segment of the pulse contact 32 into arm 4 of relay 2. Current flows through the now closed, normally opened, contact 4 of relay 2 into arm 2 of relay 1; current flows through the now closed, normally opened, contact 2 through lead 33 into relay 6 causing relay 6 to energize.

Current flows through lead 33 into the coil of relay 6 causing relay 6 to energize and breaking current on contacts 1 and 2 of relay 6. Current now ceases to flow through lead 34 de-energizing the coil of relay 7. Current also ceases to flow through lead 35 causing pulse counter in FIGURES 3C and 3D, designated as D1 through D10 inclusive, to operate one-half step. As the read head of memory unit 17 passes the pulse, just counted, pulse contacts 31 release causing current to cease flowing through lead 32 causing current to cease flowing from the now closed, normally opened, contact 4 of relay 2 causing current to cease flowing into arm 2 of relay 1, current ceasing to flow from the now closed, normally opened, contact 2 of relay 1 over lead 33 into the coil of relay 6 causing relay 6 to de-energize or open, restoring contacts of relay 6 to their normally closed condition.

It should be kept in mind that because relay 7 is a slow release relay and because the pulse from the pulse memory unit 17 is only 100 milli-seconds in duration relay 7 will not be de-energized even though power has been removed from its coil.

As relay 6 is restored to its normally closed position power again flows from arm 1 of relay 6 into the now made normally closed contact 1 of relay 6 through lead 34 to relay 7. Current also flows through arm 2 of relay 6 into the now closed contact of relay 6 over lead 35 into pulse counter represented in FIGURES 3C and 3D causing the other half of the count cycle to take place at this point relays D1 and D1' are energized. It should be noted that this sequence will take place each time a pulse is read by memory unit 17. At the end of the pulse train relay 6 will remain energized for 500 milli-seconds causing relay 7 to overcome its field inertia and de-energize. As relay 7 de-energizes current flows from arm 1 of the now made relay 8 into now closed, normally open, contacts 1 over lead 36 into arm 1 of relay 7 into the now made, normally closed, contact 1 of arm 7 and into the operate coil of relay 9, causing relay 9 to energize. As relay 9 energizes positive current is removed from arm 2 of relay 9 and current ceases to flow through lead 26 causing relay 3 to be de-energized and thereby turn off memory unit 17.

The aforementioned sequence of events will be called a pulse sequence in the present disclosure. By way of example, if there had been four pulses within the last pulse sequence, relays D4 and D4' would now have been energized in the counter-circuit of FIGURES 3C and 3D.

Figure 2D:
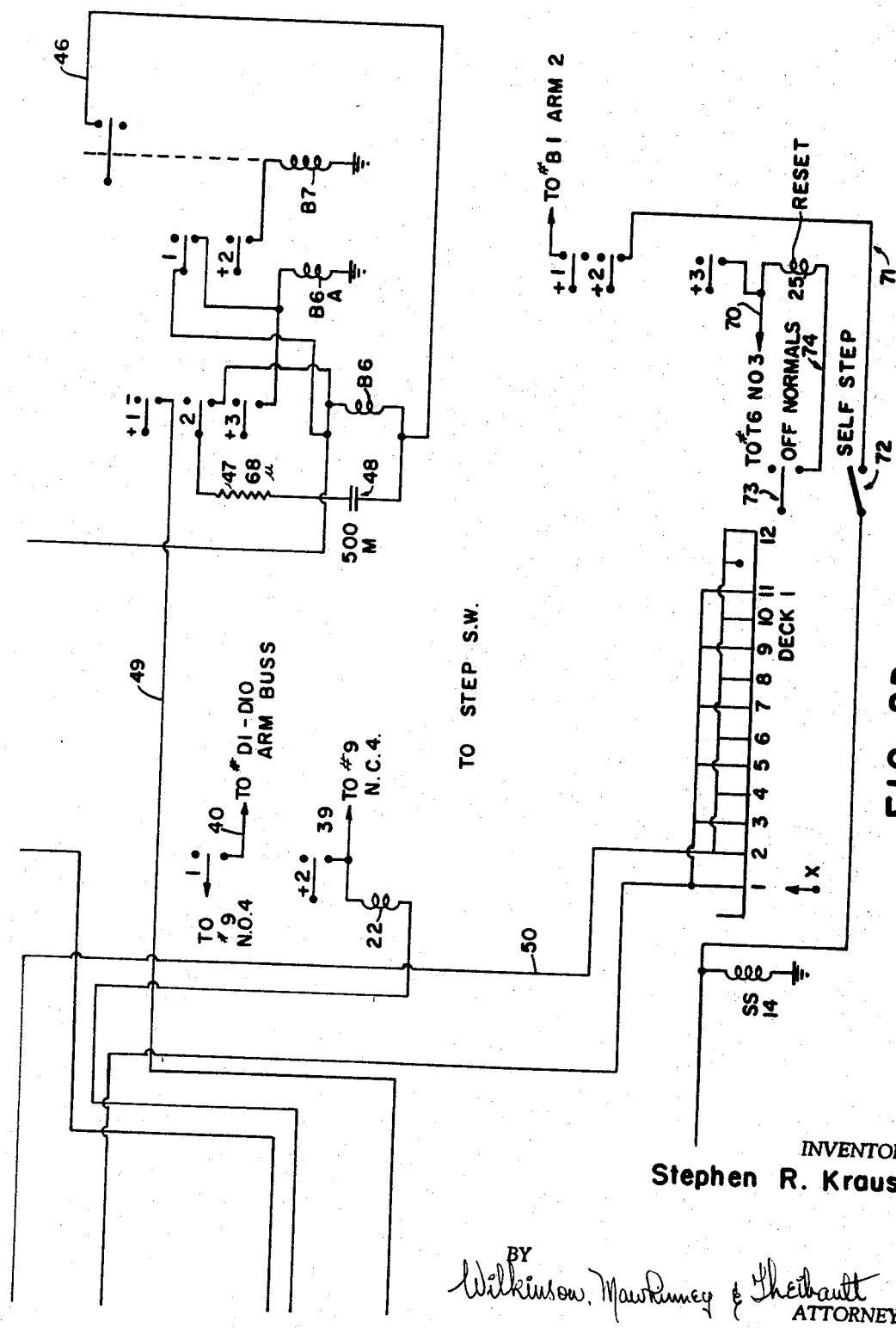

As relay 9 is energized current now flows through arm 1 of relay 9, through now closed normally open, contact 1 of relay 9 through lead 37 into arm 2 of relay 8. Current then flows from the now closed, normally open, contact 2 of relay 8 into the latch release coil 38 of relay 8 causing relay 8 to release. Simultaneously current flows through arm 4 of relay 9 into now closed, normally open, contact 4 of relay 9 and into arm 1 of relay 22 (FIGURE 2D). Relay 22 has been latched by virtue of the fact that relay 9 had, at the beginning of the sequence, been in an unlatched or opened position causing current to flow from arm 4 of relay 9 originally into the operate coil of relay 22. When relay 9 became energized current was removed from normally open contact 4 of relay 9 and lead 39 causing current to be removed from the juncture of relays 9 and 22 through lead 39. However, as relay 22 became operable positive current flowed through arm 2 of relay 22 into the now closed, normally open, contact 2 of relay 22 causing parallel power of current flow into the coil of relay 22 thereby guaranteeing that relay 22 would remain closed even though relay 9 were to become energized removing the current power over lead 39.

Figure 3C:
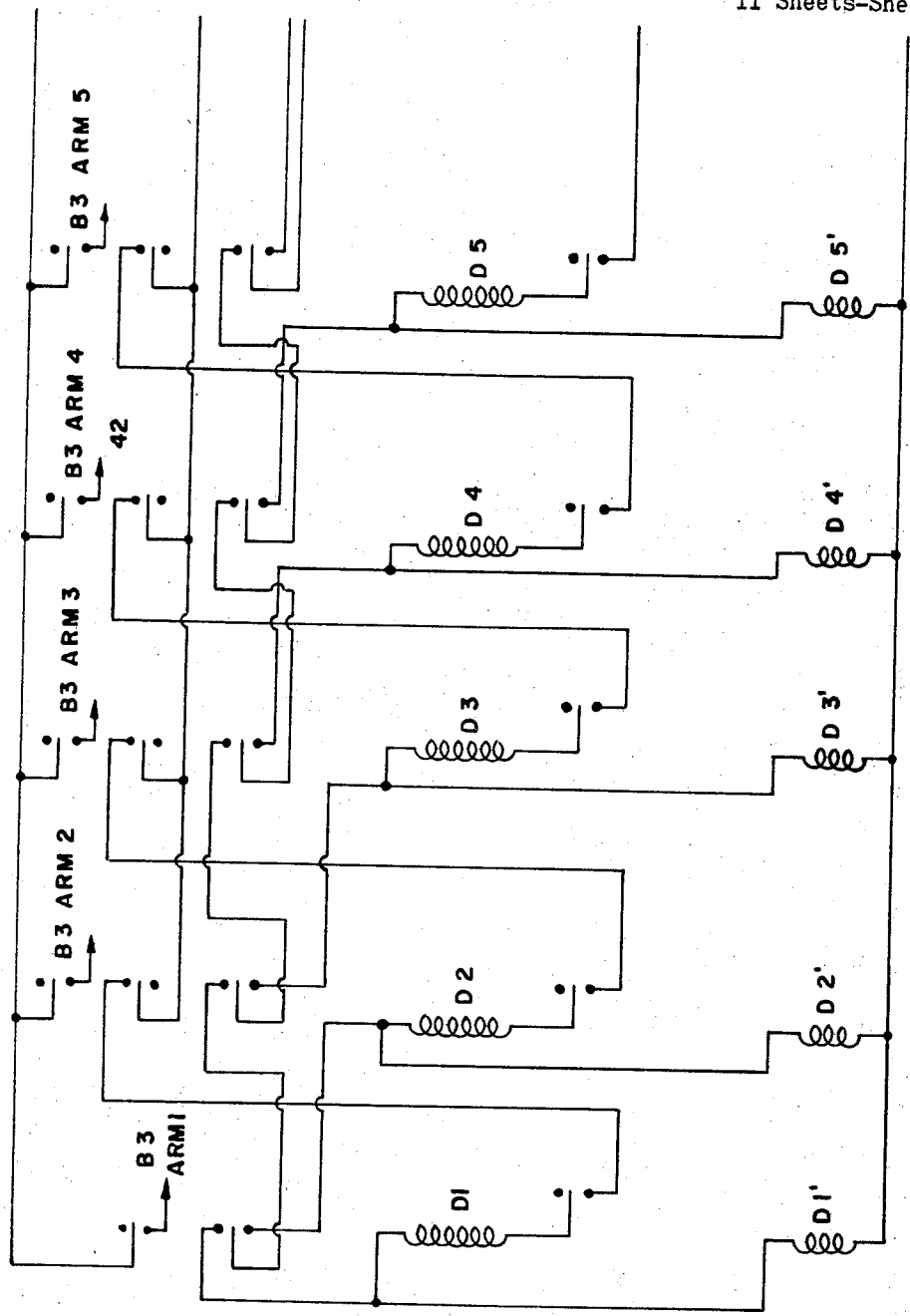
Figure 3D:
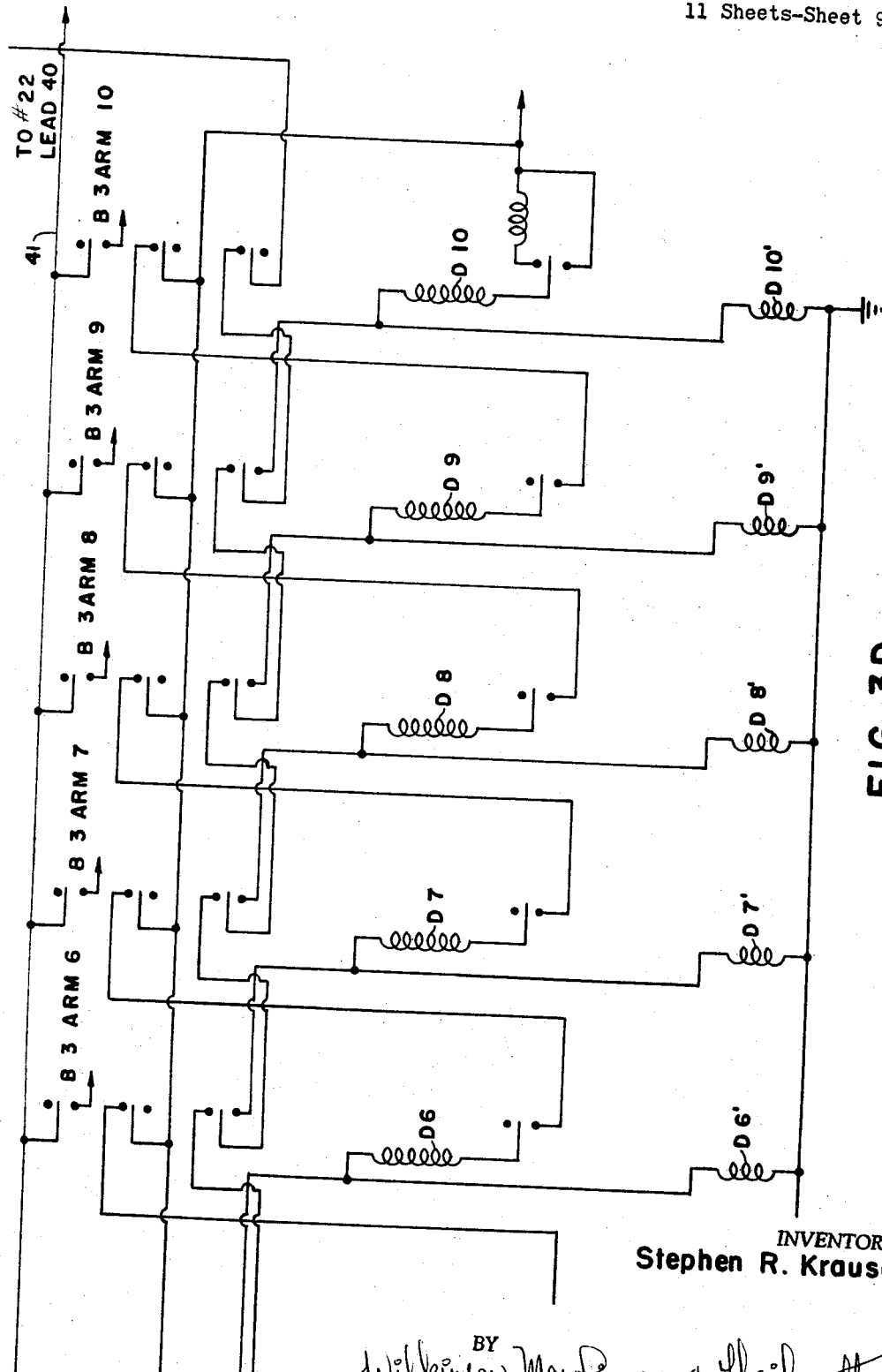

Current flows through the now closed, normally open, contact 1 of relay 22 through lead 40 into arm bus 41 of the pulse counter unit in FIGURES 3C and 3D causing positive current to be present on arm 1 of relays D1 through D10. Due to the fact that four pulses were originally counted from memory unit 17 relays D4 and D4' of the counter-circuit are now energized, current now flows from arm bus 41 into arm 1 of relay D4 and into the now closed, normally open contact 1 of relay D4. Current flows through lead 42 into lead D4 in FIGURE 2C of relay B4 lead D4 is a bus between arm 4 of relay B4 and arm 4 of relay B5. Due to the fact that the timing select relay B5 has already been energized by virtue of stepping switch 14 having moved one step to normally open contact 1, of deck 1, causing positive current to flow from arm 1, of deck 1, into said timing select relay B5. Relay B5 is now energized. Current, therefore, flows through lead D4 into arm 4 of relay B5 through now closed, normally open, contact 4 of relay B5 and into timing relay T4 through lead 43 (FIGURE 2C). Relay T4 now energizes causing resistor R4 to be shunted into position 44 of the SCR circuit in FIGURE 4. Positive current now flows through arm bus 45 through arm 3 of relay T4 into the now closed, normally open, contact 3 of relay T4 and into arm bus 46 as current flows through bus 46 relay B6 in FIGURE 2D becomes energized causing positive current to flow through arm 3 of relay B6 into now closed, normally open, contact 3 of relay B6 causing relay B6a to become energized. Current flows through arm 2 of relay B6a to the now closed, normally open, contact 2 of relay B6 energizing relay B7. As relay B7 is energized current flows through arm 1 of relay B7 into the normally closed contact of relay B7 over lead 46 into the negative side of the coil of relay B6, causing the coil of relay B6 to de-energize. However, through resistors 47 and capacitor 48 (FIGURE 2D) the relay B6 releases slowly. Current, however, is still flowing through arm 1 of relay B6 into now closed, normally open, contact 1 of relay B6 through lead 49 and into relay B1 causing the coil of relay B1 to energize. As relay B1 energizes current flows from arm 6 of relay 1 into now closed, normally open, contact 6 of relay B1 over lead 22 into relay 24 causing positive current to flow from arm 1 of relay 24 into now closed, normally open, contact 1 of relay 24 over lead 23 causing step switch coil 14 to operate and move arm to normally open contact 2. As the arm on deck 1 of step switch 14 moves to position 2 current ceases to flow from normally open contact 1 of step switch 14 into timing select relay B5 causing timing select relay B5 to deenergize as the arm moves to normally open contact 2 of step switch 14. Current then flows from the arm into normally open contact 2 through lead 50 energizing the coil of relay B4.

The same sequence has occurred when the memory unit began its second cycle and another pulse train is read, by way of example, should the second pulse train contain four pulses as did our first pulse train current would then flow into the same arm bus D4 of relay B4 and relay B5 (FIGURE 2C); but this time the bottle select B4 will be energized causing current to flow through arm 4 of relay B4 into the now closed contact of relay B4 through lead 51 causing relay R4 to become energized. As relay R4 becomes energized current flows from arm bus 52 into the now closed, normally open, contact 1 of relay R4 into bottle counter 4 causing bottle counter 4 to count one pulse. Simultaneously current flows from the SCR card lead 53 into arm 2 of relay R4. Current also flows through now closed, normally open, contact 4 of relay R4 into solenoid 4 of bottle 4 causing a flow duration dictated by the still holding timing relay T4. The timing sequence is set by virtue of timing resistor R4 in the SCR timing circuit at area 44 of the SCR card (FIGURE 4). Current also flows through the bus 54 into arm 3 of relay R4 causing current to flow through arm 3 of relay 4, over lead 55 through now closed, normally open, contact 3 of relay R4 into lead 55. Current flows over lead 55 into the coil of relay 10. Relay 10 energizes causing current to flow through arm 2 of relay 10 into now closed, normally open, contact 2 of relay 10 into the operate coil of relay 11. Relay 11 now energizes causing current to flow through arm 3 of relay 11 through now closed, normally open, contact 3 of relay 11 through lead 56 and into the coil of relay 12.

At present negative potential is present on arm 1 of relay 12 and through the normally closed contacts 1 of relay 12 completing the power over lead 57 into the negative end of the coil of relay 10. As relay 12 energizes this negative potential on lead 57 and relay 10 slowly deenergizes. It should be pointed out that when relay 10 becomes energized arm 1 and normally open contact 1 make over leads 58 and 59 causing a start-to-pull pulse to be present on area 60 at the left-hand of FIGURE 4, to the SCR card. This controls the solenoid operation through relay R4 to open the valve 11 on the selected bottle to permit pouring through the valve 11 to occur under the control of solenoid 10.

In the way of description, in the left-hand corner of FIGURE 2C is shown the 28 volt D.C. solenoid power supply and connected in series with the negative return of said power supply is relay W1. As the solenoid is operated through the aforementioned procedure, relay W1 connects in series to the solenoid power supply, causing energizing of the coil W1. As relay W1 energizes current is made to flow from arm 2 of relay W1 into the now closed, normally open, contact 1 of relay W1 and into the operate coil W2 causing coil W2 to energize. Current flows from arm 2 of relay W2 into the now closed, normally open, contact 2 of coil W2 over lead 61. When the solenoid valve is released relay W1 quickly becomes deenergized thereby removing power from relay W2. However, due to RC timing constant 62 relay W2 will stay energized several 100 milliseconds after relay W1 has returned to its normally closed position causing current to flow through lead 61 into the now closed, normally open, contact 1 of relay W1 into arm 1 of relay W1 and into arm 11 of relay B4. Current continues to flow through arm 1 through now closed, normally open, contact 11 of relay B4 causing the coil relay B3 to operate or energize. Current then flows from arm 1 of relay B3 into now closed, normally open, contact 1 of relay B3 over lead 63 and to arm bus 64 into the timing latch relays due to the fact that relay T4 has been latched in order to provide the time constant for the last solenoid operation the contacts 1 to 4 of relay T4 are closed and current is made to flow from arm bus 64 into arm 4 of relay T4 into now closed normally open contact 4 of relay T4 and into latch relay B5 causing said relay T4 to release. Current also flows from arm 2 of relay B3 through open contact of B3 through lead 66 into operate coil of relay B1 causing relay B1 to operate. As B1 operates the entire memory sequence will be repeated as described above for the third pulse train on the second complete sequence.

A pulse train with seven pulses is programmed into memory unit 17 which causes timing relay T7 to close after a pulse sequence has taken place. When relay T7 operates current flows from arm 1 of relay T7 through lead 67 into the latch release of relay 2 of FIGURE 3A causing said latch 68 to release thereby resetting the memory pulse count circuit. In addition to and simultaneously therewith current also flows through arm 3 of relay T7 into the now closed, normally open, contact 3 of relay T7 through 1 line 69 into lead 64 causing any timing latch coils that happen to be energized to also release. Current flows through arm 4 of relay T7 through lead 70 to operate coil of relay 25 causing relay 25 to energize. As relay 25 energizes current will flow through arm 2 of relay 25 into the now closed, normally open, contact of relay 25 through lead 71 through the self-step contacts 72 of stepping switch 14 into the coil of step switch 14 causing step switch 14 to complete one cycle and return to the home position. When step switch 14 reaches its home position, off-normal contacts 73 returns to their normally closed position thereby removing ground potential through lead 74 into relay 25 retaining relay 25 inoperative.

It should be noted that the memory unit 17 has certain characteristics, whereby the first pulse train may or may not be picked up due to a time delay constant within the memory unit. When start switch 20 is depressed, a jogging time constant is placed into unit 17 provided that the last sequence was completed. This jogging sequence moves the tape head a certain distance to allow it to come into contact with the first pulse train. However, if the last sequence was stopped for any reason before the end, the jogging sequence will only be half of its ordinary duration, in which case the tape head during that period of time will have encountered no pulses.

In order to relieve the operator from the chore of depressing the start switch 20 twice, a circuit represented by relays 5C and 5B counteract this short jog when it should occur allowing the tape head to continue until pulses are read. When switch 20 on unit 17 is depressed, latch contacts 28 make causing relay 5 to operate. Should unit 17 stop because of a short jog period, latch 28 will release causing relay 5 to release. Should relay 5 release before pulse arm contacts 31 pulse, the following will occur. When latch contacts 28 pull in upon the first depression of start switch 20 causing relay 5 to operate, current flows from arm 1 of relay 5 through the now closed, normally open, contacts 1 of relay 5 through lead 100 into the normally closed contact 4 of relay 8. Relay 8 was immediately energized by virtue of relay 7 and relay 6 becoming energized when relay 5 became activated. As the short jog comes into memory unit 17 causing latch 28 to release, relay 5 will release and in turn will cause relay 9 to operate or latch. As relay 9 operates, the current will flow from arm 1 of relay 9 through the now made normally closed contacts of relay 9 into arm 2 of relay 8 through the now closed, normally open, contacts of relay 8 into latch coil 38 releasing relay 8. As this occurs, the connection is completed from the normally closed contact 4 of relay 8 through the arm of relay 8 into normally open contact 1 of stepping switch 14, deck F.

As we have previously noted, stepping switch 14 has moved one point to position 1. Current, therefore, flows from the normally open contact 1 of deck F into normally closed contact 1 of relay 5D. Relay 5D being de-energized at the time causes current to again flow from normally open contact 1 of relay 5D into arm 1 of relay 5D over wire 101 into relay 5C causing 5C to lock up and latch. As relay 5C latches plus current flows from arm 3 of relay 5C into the now made normally open contacts of relay 5D causing relay 5D to energize. Current also flows from relay 5 arm 1 into the now closed contact 1 of relay 5 through lead 102 into arm 1 of relay 5C. Current again flows from the now closed, normally open, contacts 1 of relay 5C down to the latch coil 103 of relay 9 causing relay 9 to unlatch, thereby repeating the start cycle a second time.

Referring now to the physical structure embodying the above described electronic circuitry, and for the moment to FIGURE 5, 75 designates a cabinet structure having a door 76 hinged thereto. Within the cabinet are shelves 77, 78 for supporting gallon size liquid containers 79. Each container has a neck stopper 80 through which passes a hollow plastic tube 81. All the container tops are connected in parallel and a constant head pressure is maintained on the liquid in each container regardless of amount by pump 82 which is driven by an electric motor.

The base of each liquid container 79 is provided with a discharge to which is connected a hollow plastic tube 83 for leading the liquid contents of containers to their proper solenoid actuated flow valve 11.

The lower shelves 84 support the counter components and their digital read-out units 85 while shelf 86 supports the remaining electronic components described hereinbefore.

In the embodiment shown in FIGURE 6, the liquid containers 79A are shown inverted and retained in place by arms 87 which are pivoted and spring biased to the container grasping position shown. The neck of each container is immersed in a reservoir 88 which maintains a constant level for gravity feed to the liquid flow valves 11 which have hollow plastic tubes 89 leading to a mixing area 90. The entire unit is housed in a cabinet 91.

The tape memory unit 17 employed to store the formulations of liquids to be mixed may be of the type shown in U.S. Patent No. 3,124,645 to William G. Whitney, granted Mar. 10, 1964. This is an endless tape which may be driven in either direction having a read-write head for placing a formulation on each transverse line and which will read a previously stored formulation. The tape unit 17 is placed convenient to the machine operator and may also be under coin or credit card actuation control and may be capable of pointing out records of drinks dispensed.

An example of a credit card actuating and accounting device which may be employed with this device is shown and described in U.S. Patent No. 3,184,714 to H. L. Brown et al., granted May 18, 1965.

Having thus described the present invention in rather full detail, it will be understood that these details need not be strictly adhered to but that various changes and modifications may suggest themselves to one skilled in the art, all falling within the scope of the invention as defined by the appended claims.

What I claim is:
1. Liquid dispensing device comprising:
   (a) a plurality of containers each adapted to contain a different liquid,
   (b) a solenoid actuated valve for each container,
   (c) a plurality of timing units adapted to be placed in circuit with any one of said solenoid valves,
   (d) solenoid valve selecting means, one for each solenoid,
   (e) solenoid circuit triggering means in selective circuit with said timing units and said solenoid selector and said solenoid to actuate the selected solenoid to permit fluid flow through the valve for the time period selected,
   (f) switch means in circuit with said time units and solenoid selectors to sequentially program the dispensing of liquid from said containers to mix the liquids; and
   (g) a selectively programmed signal device connected to said switch means to sequentially select the solenoid valve to control which container will dispense and which time unit will be applied to the solenoid controlling the dispensing valve.
2. A device as claimed in claim 1 wherein said containers have their liquid contents subjected to a constant head regardless of the amount of liquid in the container to assure of a uniform flow rate for each selected time interval.
3. A device as claimed in claim 1 wherein said timing units are electrical resistances of a different value for each selected time period and adapted to be placed in the gating circuit of an SCR which control the solenoid circuit triggering means.
4. A device as claimed in claim 1 wherein said switch means in circuit with said time units and solenoid selectors is a step switch controlled by a pulse counter which reads a magnetic tape memory.
5. A device as claimed in claim 1 wherein said selectively programmed signal device is an endless magnetic tape memory device.

References Cited
UNITED STATES PATENTS

| | | | |
|---|---|---|---|
| 3,133,674 | 5/1964 | Schmaus | 222—70 |
| 3,341,073 | 9/1967 | Arps et al. | 222—70 X |

STANLEY H. TOLLBERG, *Primary Examiner.*